(No Model.)
H. C. BRUNING, Jr.
METAL WHEEL.
No. 585,950. Patented July 6, 1897.
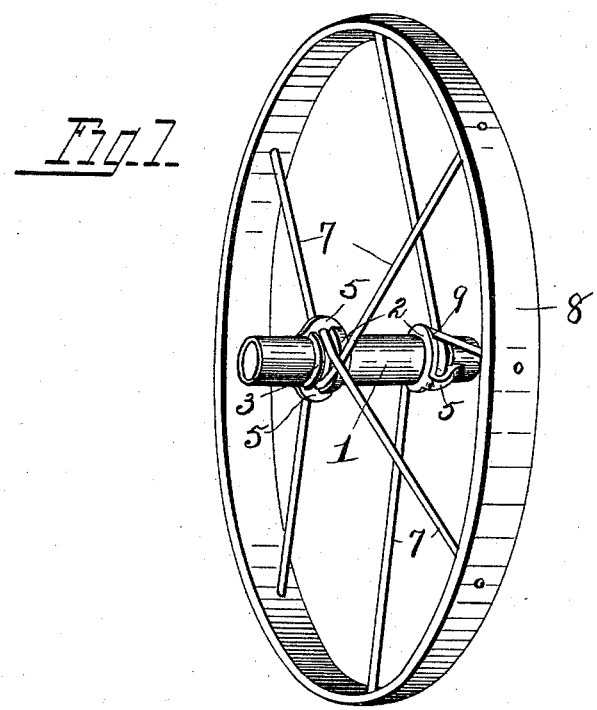
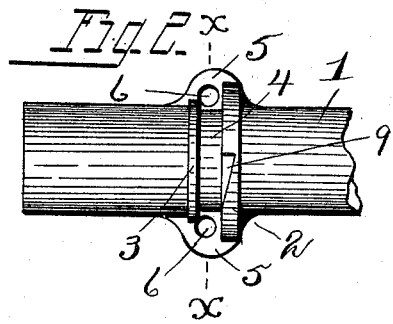
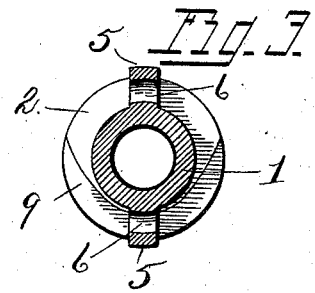
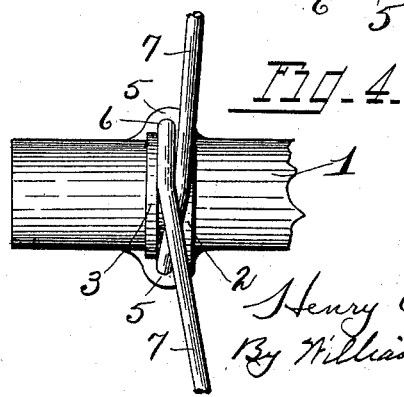
WITNESSES
Carroll J. Webster
Maud Schumacher
INVENTOR
Henry C. Bruning Jr.
By William Webster
Atty.

UNITED STATES PATENT OFFICE.

HENRY C. BRUNING, JR., OF TOLEDO, OHIO.

METAL WHEEL.

SPECIFICATION forming part of Letters Patent No. 585,950, dated July 6, 1897.

Application filed April 10, 1897. Serial No. 631,495. (No model.)

*To all whom it may concern:*

Be it known that I, HENRY C. BRUNING, Jr., of Toledo, county of Lucas, and State of Ohio, have invented certain new and useful Improvements in Metal Wheels; and I do hereby declare that the following is a full, clear, and exact description of the invention, which will enable others skilled in the art to which it appertains to make and use the same, reference being had to the accompanying drawings, and to the numerals of reference marked thereon, which form part of this specification.

My invention relates to a metal wheel for wheelbarrows, velocipedes, bicycles, &c., and has for its object to combine simplicity, strength, and cheapness in the manufacture of the wheel.

The invention further consists in the parts and combination of parts, as shown, described, and claimed.

In the drawings, Figure 1 is a perspective view of a metal wheel constructed in accordance with my invention. Fig. 2 is a side elevation of a portion of the hub. Fig. 3 is an end sectional view taken at a point indicated by lines $xx$, Fig. 2. Fig. 4 is a side elevation of a portion of the hub and spokes secured thereto.

1 designates the hub, having near each end thereof annular enlargements 2 and at a point outside thereof annular enlargements 3, the enlargements 3 being of smaller diameter than the enlargements 2, forming an annular groove 4 between the same. Upon opposite sides of the hub and connecting the enlargements 2 and 3 are longitudinal webs 5, which are formed with an opening 6 therein.

7 designates the spokes, which are of the character known as "return-bend" spokes—that is, one forms two spokes.

8 designates the rim, to which the outer ends of the spokes are secured.

To assemble the several parts of the wheel together, the ends of the spokes are inserted through the openings 6, the bend thereof engaging with the metal of the lug 5 and within the groove 4, formed between the two enlargements 2 and 3, the lugs being formed upon opposite sides of the hub.

To allow of the spokes passing each other, the outer face of each enlargement 2 is formed with a cut-away portion 9, extending from a point substantially near one lug to a point midway of the two webs, thereby forming a recess in which one of the spokes rests, the opposite spokes seating directly within the groove 4. This construction necessitates that each of the spokes be bent slightly at the point where they pass each other, which interlock and form a tension near the outer end of the spokes, which are secured in the rim.

What I claim is—

1. In a metal wheel, a hub provided with adjacent annular enlargements near each end, an annular groove formed between the same, webs connecting the enlargements at different points around the periphery of the hub, an orifice in each web, spokes passing through the orifice and resting within the groove, and secured at their outer ends to the rim.

2. In a metal wheel, a hub provided with adjacent annular enlargements near each end, webs connecting the enlargements upon opposite sides of the hub, the outer face of each inner enlargement being recessed from one of the webs to a point upon each side of the same midway of the hub, spokes passing through each web, one of the spokes seating within the recess formed by the enlargement, the opposite spoke resting in the groove formed between the two enlargements, the outer end of the spokes being secured to the rim.

In testimony that I claim the foregoing as my own I hereby affix my signature in presence of two witnesses.

HENRY C. BRUNING, JR.

Witnesses:
CARROLL J. WEBSTER,
MAUD SCHUMACHER.